United States Patent (12)
Sugiyama et al.

(10) Patent No.: US 7,636,045 B2
(45) Date of Patent: Dec. 22, 2009

(54) PRODUCT PRESENTATION ROBOT (75) Inventors: Kenichiro Sugiyama, Wako (JP); Taizou Yoshikawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 920 days.

(21) Appl. No.: 11/167,215

(22) Filed: Jun. 28, 2005

(65) Prior Publication Data
US 2006/0004488 A1   Jan. 5, 2006

(30) Foreign Application Priority Data
Jun. 30, 2004  (JP) .............................. 2004-193754

(51) Int. Cl.
G08B 13/14  (2006.01)
G06F 19/00  (2006.01)
G05B 19/04  (2006.01)

(52) U.S. Cl. ................ 340/572.1; 340/573.1; 340/5.91; 340/5.9; 340/7.52; 700/245; 700/246; 705/27

(58) Field of Classification Search ............... 340/572.1
See application file for complete search history.

(56) References Cited

U.S. PATENT DOCUMENTS

2002/0165638 A1* 11/2002 Bancroft et al. ............. 700/213
2003/0028498 A1*  2/2003 Hayes-Roth ................. 706/17
2005/0222712 A1* 10/2005 Orita .......................... 700/246
2008/0234862 A1*  9/2008 Funada et al. ............... 700/246

FOREIGN PATENT DOCUMENTS

| JP | 2002-216129 | 8/2002 |
| JP | 2002-239959 | 8/2002 |
| JP | 2003-039365 | 2/2003 |
| JP | 2003-326483 | 11/2003 |
| JP | 2004-094288 | 3/2004 |

* cited by examiner

Primary Examiner—Donnie L Crosland
(74) Attorney, Agent, or Firm—Squire, Sanders & Dempsey L.L.P.

(57) ABSTRACT

A product presentation biped robot implementing presentation of products such as vehicles through explanation of at least one among performance, specifications and operation of the products, is provided. The robot has a communication unit being capable of communicating with a database located externally of the robot and storing information including at least data needed for implementing the presentation of the products, a data acquirer accessing the database through the communication unit to acquire the data needed for implementing the presentation of one from among the products interested by a customer, and a product presentation implementor implementing the presentation of the one from among the products to the customer based on the acquired data presentation robot that implements product presentation, thereby enabling to ease the work of a salesperson.

8 Claims, 11 Drawing Sheets

| VEHICLE (NAME, ATTRIBUTES, ETC.) | IC TAG TRANSMIT SIGNALS | UNLOCK SIGNALS |
|---|---|---|
| ACCORD (RED, SEDAN) | IC1 | KEY 1 |
| CIVIC (WHITE, SEDAN) | IC2 | KEY 2 |
| ODYSSEY (BLACK, MINIVAN) | IC3 | KEY 3 |
| ⋮ | ⋮ | ⋮ |

PRODUCT PRESENTATION ROBOT

BACKGROUND OF THE INVENTION

1. Field of the Invention

This invention relates to a product presentation robot, particularly to a mobile robot capable of explaining at least one among the performance, specifications and operation of a product such as a vehicle.

2. Description of the Related Art

An auto salesperson spends many hours studying facts and figures regarding the performance, specifications and other features of a large number of models, is regularly required to commit new data to memory to keep abreast of frequent model changes, and often does not have enough time to deal with customers owing to insufficient staffing. The same will be applied to a salesperson who sells products other than vehicles.

On the other hand, recent years have seen the development of various robots designed to interface with human beings. For example, Japanese Laid-Open Patent Application No. 2003-239959 teaches a pet-like robot that rides in a car together with the driver and responds to various sensed driving conditions so as to encourage safe driving, such as by acting bored to make the driver aware that he or she has been driving for a long time or by acting frightened when the driver brakes suddenly. Also, as taught by Japanese Laid-Open Patent Application No. 2003-326483, for instance, various mobile robots have been developed that are capable of carrying out tasks in a human living environment.

However, the prior art mentioned in '959 is limited to keeping a driver amused and does not help to reduce the burden of an auto salesperson.

SUMMARY OF THE INVENTION

An object of this invention is therefore to overcome this shortcoming by applying technologies related to the aforesaid mobile robots to provide a product presentation robot that implements product presentation and capable of easing the work of a salesperson.

In order to achieve the objects, this invention provides a product presentation same robot implementing presentation of products through explanation of at least one among performance, specifications and operation of the products, comprising: a communication unit being capable of communicating with a database located externally of the robot and storing information including at least data needed for implementing the presentation of the products; a data acquirer accessing the database through the communication unit to acquire the data needed for implementing the presentation of one from among the products interested by a customer; and a product presentation implementor implementing the presentation of the one from among the products to the customer based on the acquired data.

BRIEF DESCRIPTION OF THE DRAWINGS

The above and other objects and advantages of the invention will be more apparent from the following description and drawings in which:

FIG. 10 is a diagram for explaining data stored in the keyless database shown in FIG. 5, including a set of unlock signals each associated with a specific vehicle, a set of IC tag transmit signals each associated with an IC tag placed in a specific vehicle, and the like;

DETAILED DESCRIPTION OF THE PREFERRED EMBODIMENTS

Preferred embodiments of a product presentation robot according to the invention will now be explained with reference to the attached drawings.

Figure 1:
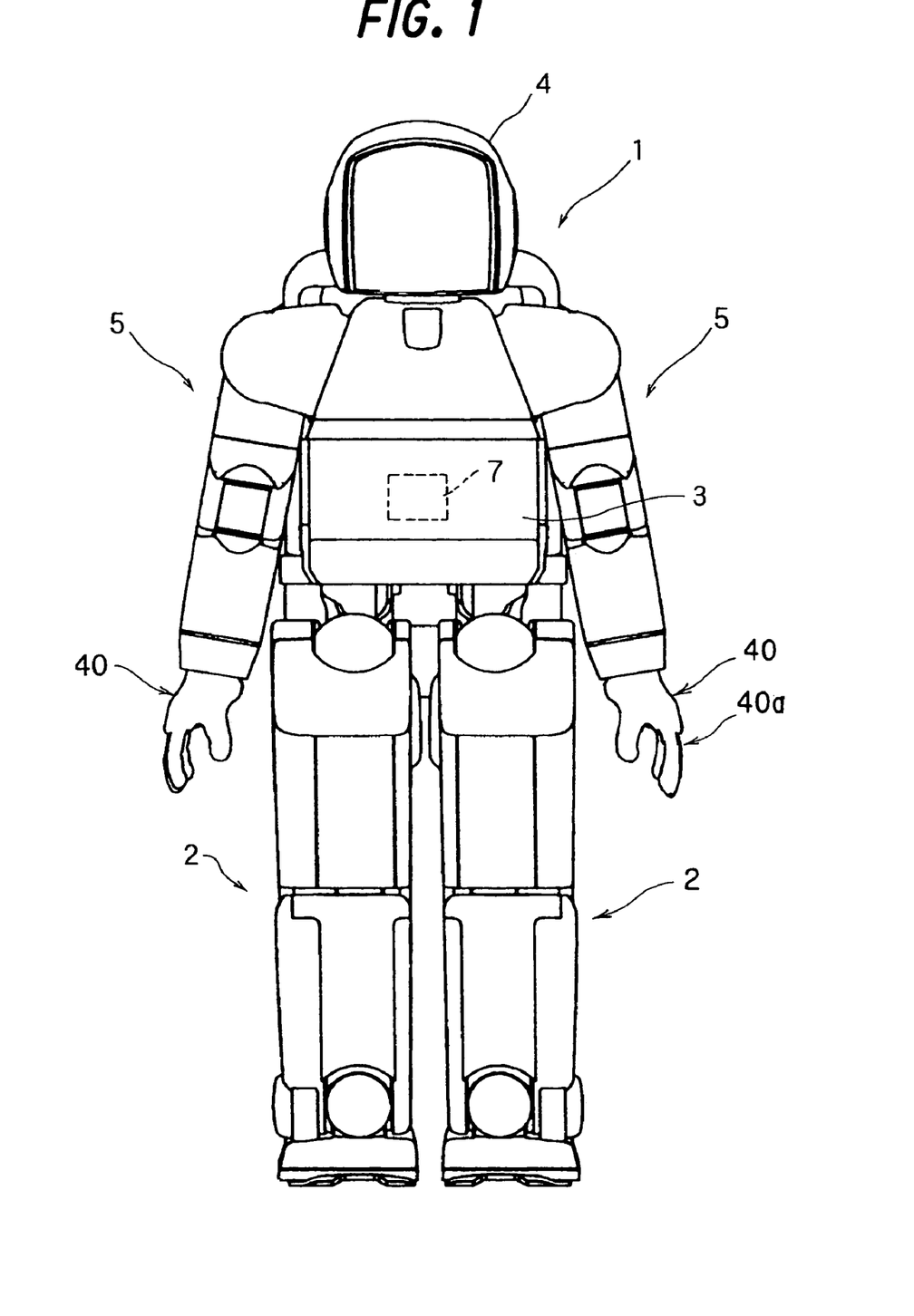
FIG. 1 is a front view of a product presentation robot according to a first embodiment of the invention.
Figure 2:
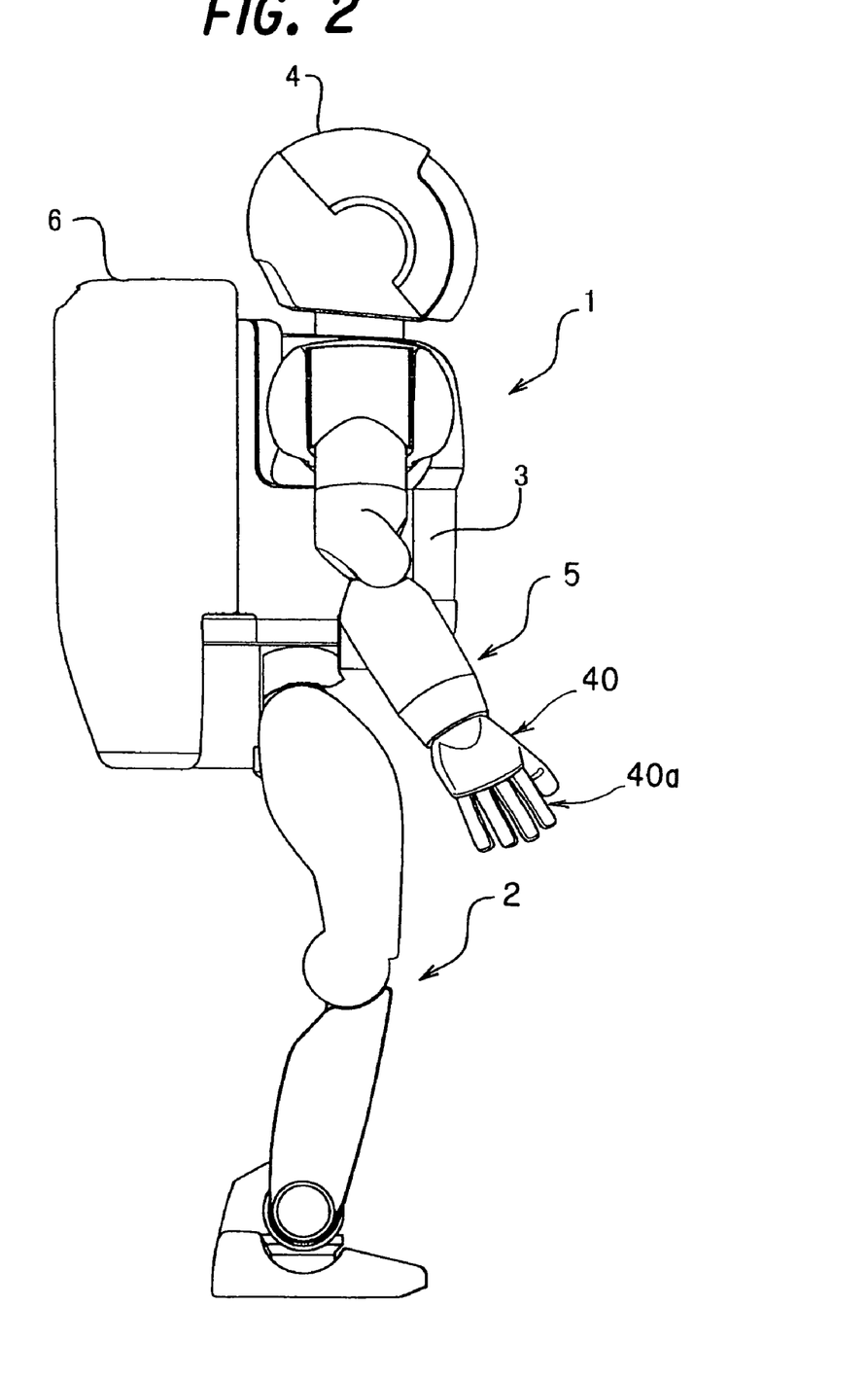
FIG. 2 is side view of the robot shown in FIG. 1.

FIG. 1 is a front view of a product presentation robot configured to be capable of implementing product presentation according to a first embodiment of the invention and FIG. 2 is a side view thereof. A humanoid legged mobile robot (mobile robot modeled after the form of the human body) provided with two legs and two arms and capable of bipedal locomotion, is taken as an example of product presentation robots.

As shown in FIG. 1, the product presentation robot (now assigned with reference numeral 1 and hereinafter called "robot") is equipped with a plurality of, specifically a pair of leg linkages (legs) 2 and a body (upper body) 3 above the leg linkages 2. A head 4 is formed on the upper end of the body 3 and two arm linkages 5 are connected to opposite sides of the body 3. As shown in FIG. 2, a housing unit 6 is mounted on the back of the body 3 for accommodating an electronic control unit (explained later), a battery and the like.

The robot 1 shown in FIGS. 1 and 2 is equipped with covers for protecting its internal structures. A keyless entry device 7 (not shown in FIG. 2) is provided inside the robot 1.

Figure 3:
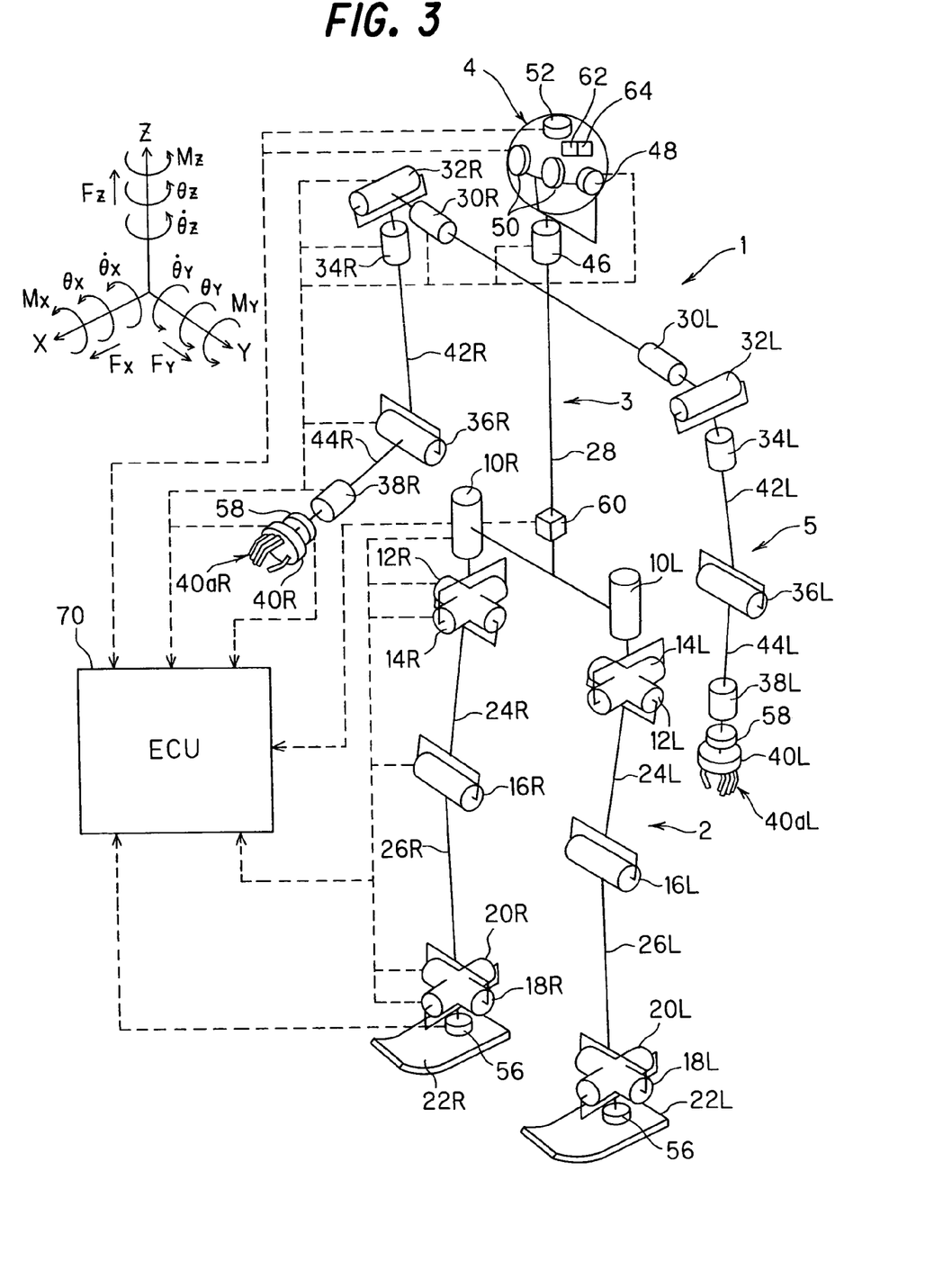
FIG. 3 is an explanatory view showing a skeletonized view of the robot shown in FIG. 1.

FIG. 3 is an explanatory diagram showing a skeletonized view of the robot 1. The internal structures of the robot 1 will be explained with reference to this drawing, with primary focus on the joints. As illustrated, the leg linkages 2 and arm linkages 5 on either the left or right of the robot 1 are equipped with six joints driven by 11 electric motors.

Specifically, the robot 1 is equipped at its hips (crotch) with electric motors 10R, 10L (R and L indicating the right and left sides; hereinafter the indications R and L will be omitted as is apparent for its symmetric structure) constituting joints for swinging or swiveling the leg linkages 2 around a vertical axis (the Z axis or vertical axis), electric motors 12 constituting joints for driving (swinging) the leg linkages 2 in the pitch (advance) direction (around the Y axis), and electric motors 14 constituting joints for driving the leg linkages 2 in the roll (lateral) direction (around the X axis), is equipped at its knees with electric motors 16 constituting knee joints for driving the lower portions of the leg linkages 2 in the pitch direction (around the Y axis), and is equipped at its ankles with electric motors 18 constituting foot (ankle) joints for driving the distal ends of the leg linkages 2 in the pitch direction (around the Y axis) and electric motors 20 constituting foot (ankle) joints for driving them in the roll direction (around the X axis).

As set out in the foregoing, the joints are indicated in FIG. 3 by the axes of rotation of the electric motors driving the joints (or the axes of rotation of transmitting elements (pulleys, etc.) connected to the electric motors for transmitting the power thereof). Feet 22 are attached to the distal ends of the leg linkages 2.

In this manner, the electric motors 10, 12 and 14 are disposed at the crotch or hip joints of the leg linkages 2 with their axes of rotation oriented orthogonally, and the electric motors 18 and 20 are disposed at the foot joints (ankle joints) with their axes of rotation oriented orthogonally. The crotch joints and knee joints are connected by thigh links 24 and the knee joints and foot joints are connected by shank links 26.

The leg linkages 2 are connected through the crotch joints to the body 3, which is represented in FIG. 3 simply by a body link 28. The arm linkages 5 are connected to the body 3, as set out above.

The arm linkages 5 are configured similarly to the leg linkages 2. Specifically, the robot 1 is equipped at its shoulders with electric motors 30 constituting joints for driving the arm linkages 5 in the pitch direction and electric motors 32 constituting joints for driving them in the roll direction, is equipped with electric motors 34 constituting joints for swiveling the free ends of the arm linkages 5, is equipped at its elbows with electric motors 36 constituting joints for swiveling parts distal thereof, and is equipped at the distal ends of the arm linkages 5 with electric motors 38 constituting wrist joints for swiveling the distal ends. Hands (end effectors) 40 are attached to the distal ends of the wrists.

In other words, the electric motors 30, 32 and 34 are disposed at the shoulder joints of the arm linkages 5 with their axes of rotation oriented orthogonally. The shoulder joints and elbow joints are connected by upper arm links 42 and the elbow joints and wrist joints are connected by forearm links 44.

Although not shown in the figure, the hands 40 are equipped with a driving mechanism comprising five fingers 40a. The fingers 40a are configured to be able to carry out a task, such as grasping an object.

Figure 4:
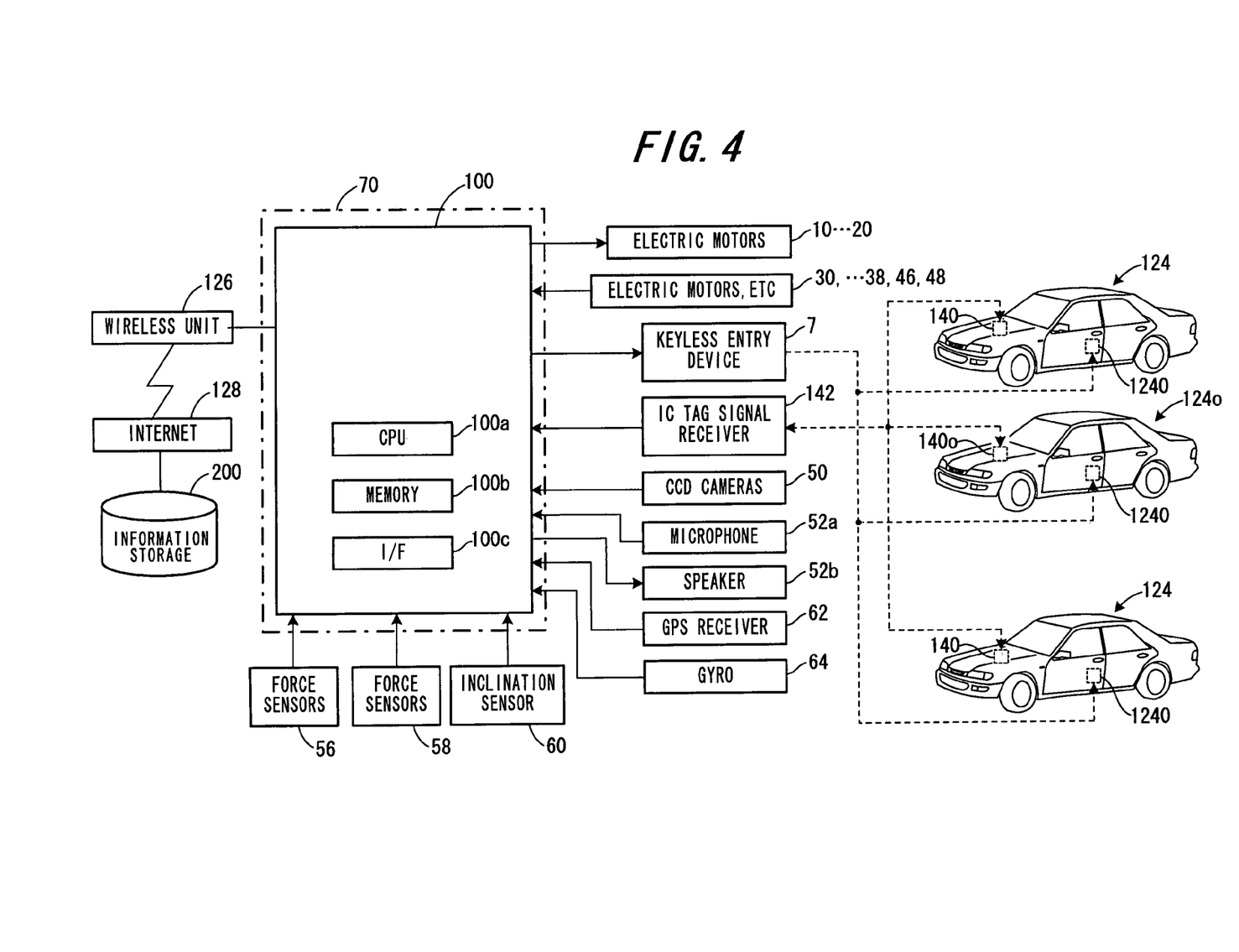
FIG. 4 is a block diagram showing the configuration of an electronic control unit (ECU) shown in FIG. 3.

The head 4 is connected to the body 3 through an electric motor (comprising a neck joint) 46 around a vertical axis and a head nod mechanism 48 for rotating the head 4 around an axis perpendicular thereto. As shown in FIG. 3, the interior of the head 4 has mounted therein two CCD cameras 50 that can produce stereoscopic images, and a voice input/output device 52. The voice input/output device 52 comprises a microphone 52a and a speaker 52b, as shown in FIG. 4 later.

Owing to the foregoing configuration, the leg linkages 2 are each provided with 6 joints constituted of a total of 12 degrees of freedom for the left and right legs, so that during locomotion the legs as a whole can be imparted with desired movements by driving (displacing) the six joints to appropriate angles to enable desired walking in three-dimensional space. Further, the arm linkages 5 are each provided with 5 joints constituted of a total of 10 degrees of freedom for the left and right arms, so that desired tasks can be carried out by driving (displacing) these 5 joints to appropriate angles. In addition, the head 4 is provided with a joint and the head nod mechanism constituted of 2 degrees of freedom, so that the head 4 can be faced in a desired direction by driving these to appropriate angles.

Each of the electric motors 10 and the like is provided with a rotary encoder (not shown) that generates a signal corresponding to at least one among the angle, angular velocity and angular acceleration of the associated joint produced by the rotation of the rotary shaft of the electric motor.

A conventional six-axis force sensor (hereinafter referred to as "force sensor") 56 is attached to each foot member 22, generates signals representing, of the external forces acting on the robot, the floor reaction force components Fx, Fy and Fz of three directions and the moment components Mx, My and Mz of three directions acting on the robot from the surface of contact.

Similar force sensors (six-axis force sensor) 58 are also attached between the wrist joints and the hands 40 for outputting signals representing force components Fx, Fy and Fz of three directions and moment components Mx, My and Mz of three directions of external forces other than floor reaction forces acting on the robot 1, specifically external forces acting on the hands 40 from objects (object reaction forces).

In addition, an inclination sensor 60 installed on the body 3 generates a signal representing at least one of the inclination (tilt angle) relative to the vertical axis and the angular velocity thereof, i.e., representing at least one quantity of state such as the inclination (posture) of the body 3 of the robot 1.

The interior of the head 4 is equipped with a GPS receiver 62 that receives a signal from GPS (Global Positioning System; shown in a figure for a second embodiment), and a gyro 64, in addition to the CCD cameras 50 and voice input/output device 52.

The outputs of the force sensors 56 etc. are inputted to an electronic control unit (hereinafter referred to as "ECU") 70 that comprises a microcomputer and is provided in the housing unit 6 (in the figure, the input/output is shown only for the right side of the robot 1 for ease of illustration).

FIG. 4 is a block diagram showing the configuration of the ECU 70.

The ECU 70 comprises a microcomputer 100 equipped with a CPU 100a, memory unit 100b and input-output interface 100c. The ECU 70 calculates joint angular displacement commands is used to control the electric motor 10 and other motors constituting the joints so as to enable the robot 1 to keep a stable posture while moving. As explained below, it also implements or performs various processing operations, including ones for product presentation. These will be explained later.

Figure 5:
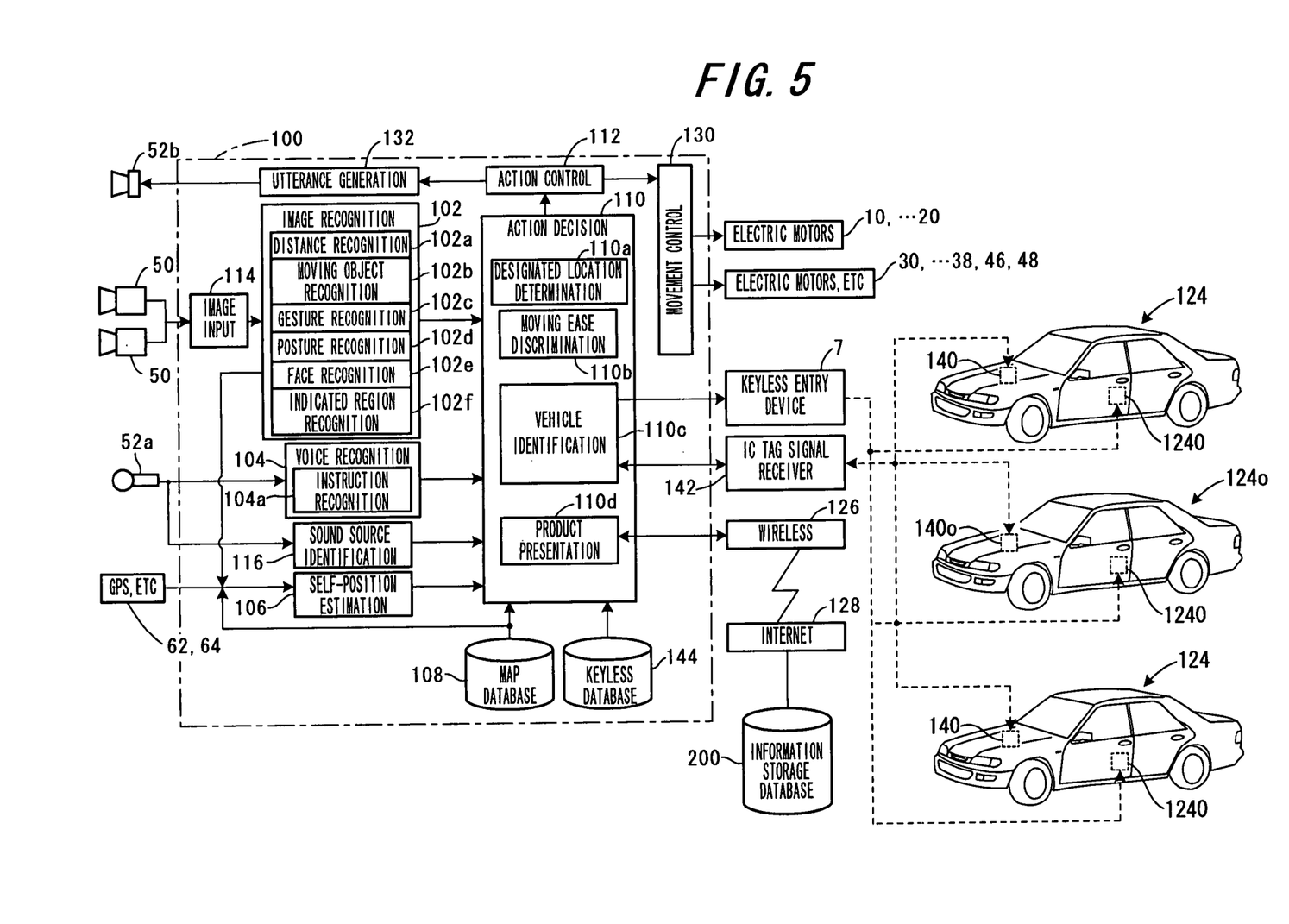
FIG. 5 is block diagram functionally illustrating the operation of a microcomputer of the electronic control unit shown in FIG. 4.

FIG. 5 is block diagram showing the processing operations of the CPU 100a in the microcomputer 100 of the ECU 70. It should be noted that many of the sensors, etc., are not shown in FIG. 5.

As can be seen from FIG. 5, the CPU 100a is equipped with, inter alia, an image recognition unit 102, voice recognition unit 104, self-position estimation unit 106, map database 108, action decision unit 110 for deciding actions of the robot 1 based on the outputs of the foregoing units, and action control unit 112 for controlling actions of the robot 1 based on the actions decided by the action decision unit 110. In FIG. 5, for ease of illustration, the term "unit" is omitted.

These units will be explained individually.

The image recognition unit 102 comprises a distance recognition unit 102a, moving object recognition unit 102b, gesture recognition unit 102c, posture recognition unit 102d, face region recognition unit 102e, and indicated region recognition unit 102f. Stereoscopic images of the surroundings taken and produced by two CCD cameras 50 are inputted to the distance recognition unit 102a through an image input unit 114.

The distance recognition unit 102a calculates data representing distances to imaged objects from the parallax of the received stereoscopic images and creates distance images. The moving object recognition unit 102b receives the distance images and calculates differences between images of multiple frames to recognize (detect) moving objects such as customers, vehicles and the like.

The gesture recognition unit 102c utilizes techniques taught in Japanese Laid-Open Patent Application No. 2003-077673 (proposed by the assignee) to recognize hand movements of customers and the like and compares them with characteristic hand movements stored in memory beforehand to recognize gestured instructions accompanying utterances of customers and the like.

The posture recognition unit 102d uses techniques taught in Japanese Laid-Open Patent Application No. 2003-039365 (proposed by the assignee) to recognize the posture of customers and the like. The face region recognition unit 102e uses techniques taught in Japanese Laid-Open Patent Application No. 2002-216129 (proposed by the assignee) to recognize the face regions of customers and the like. The indicated region recognition unit 102f uses techniques taught in Japanese Laid-Open Patent Application No. 2003-094288 (proposed by the assignee) to recognize directions indicated by the hands and the like of customers and the like.

The voice recognition unit 104 is equipped with an instruction recognition unit 104a. The instruction recognition unit 104a receives the voices of customers and the like inputted through the microphone 52a of the voice input-output unit 52 and uses vocabulary stored in the memory unit 100b beforehand to recognize instructions of customers and the like and zooms a region designated by the instructions. The voice inputted from the microphone 52a is sent to a sound source identification unit 116 that identifies or determines the position of the sound source and discriminates between voice and non-voice impact noise.

The self-position estimation unit 106 receives GPS signals or the like through the GPS receiver 62 and uses them to estimate (detect) the current position of the robot 1 and the direction in which it is facing.

The map database 108 resides in the memory unit 100b and stores map information compiled in advance by recording features of the surrounding vicinity and the locations of obstacles within a region including test-driving course.

Figure 6:
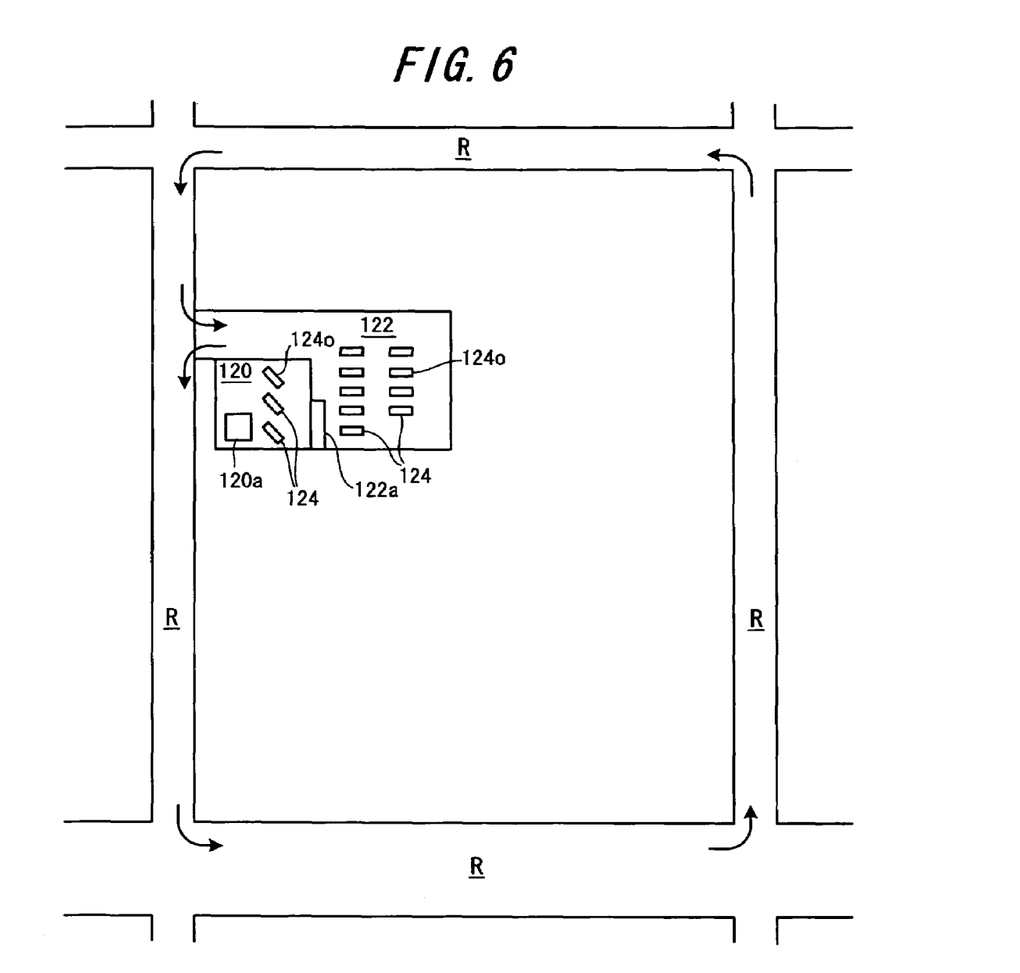
FIG. 6 is an explanatory diagram showing surrounding vicinity map information stored in a map database shown in FIG. 5.

FIG. 6 is an explanatory diagram showing the surrounding vicinity, specifically an auto dealer's showroom 120, neighboring parking lot 122, number of vehicles (products) 124 on display in the auto dealer's showroom 120 and the parking lot 122, and roads R near the auto dealer's showroom 120, including those used for the test-driving course. The map database 108 stores (contains) map information compiled to include obstacles in the auto dealer's showroom 120 and parking lot 122 such as an inside reception area 120a, a step 122a in the parking lot 122 and the like, and also to include the roads R in the vicinity.

The explanation of FIG. 5 will be continued.

The action decision unit 110 is equipped with a designated location determination unit 110a, moving ease discrimination unit 110b, vehicle identification unit 110c, and product presentation unit 110d.

Based on the region the image recognition unit 102 recognized as that designated by the customer or the like and the designated region zoomed in by the voice recognition unit 104, the designated location determination unit 110a determines, as a desired movement destination value, the location designated by the customer or the like, more specifically the location of the particular vehicle 124o or the like among the vehicles 124 with respect to which the customer wants a product presentation.

The moving ease discrimination unit 110b recognizes the locations of obstacles present in the map information read from the map database 108 for the region around the current location of the robot 1, defines the areas near the obstacles as hazardous zones, defines zones up to a certain distance away from the defined hazardous zones as potentially hazardous zones and judges the moving ease in these zones as "difficult," "requiring caution" or similar.

The action decision unit 110 uses the recognition results of the image recognition unit 102 and voice recognition unit 104 to discriminate whether it is necessary to move to the designated location determined by the designated location determination unit 110a. Further, when the moving ease discrimination unit 110b makes a "difficult" determination, for example, based on the discriminated moving ease, the action decision unit 110 decides to lower the walking speed and the like and decides the next action of the robot 1 in response to information received from the image recognition unit 102, voice recognition unit 104 and the like. For example, when sound source position information is outputted by the sound source determination unit 116, the action decision unit 110 decides to reorient the robot 1 to face toward the sound source.

Explanation will be made later regarding the vehicle identification unit 110c and product presentation unit 110d.

The action decisions of the action decision unit 110 are sent to the action control unit 112. The action control unit 112 responds to the action decisions by outputting action instructions to a movement control unit 130 or an utterance generation unit 132.

The movement control unit 130 is responsive to instructions from the action control unit 112 for outputting drive signals to the electric motor 10 and other motors of the legs 2, head 4 and arms 5, thereby causing the robot 1 to move (act).

In accordance with instructions from the action control unit 112, the utterance generation unit 132 uses character string data for utterances to be made stored in the memory unit 100b to generate synthesized voice signals for the utterances and uses them to drive the speaker 52b of the voice input-output unit 52. The utterance generation unit 132 and speaker 52b of the voice input-output unit 52 constitute an utterance unit.

The vehicle identification unit 110c and product presentation unit 110d will now be explained.

As explained above, this invention is directed to applying mobile robot technologies to make the auto sales work of auto salespersons easier. In line with this object, a configuration is adopted wherein the vehicle identification unit 110c identifies or determines the vehicle 124o with regard to which the customer wants a product presentation (or wants to test drive in addition to receiving a product presentation), whereafter the product presentation unit 110d accesses an information storage server (shown as "INFORMATION STORAGE" in FIG. 4) 200 that is externally located in a management computer (not shown) at, for example, the head office of the company operating the auto dealer's showroom 120 (or at the company that manufactured the vehicle 124) and that stores information including at least data required for implementing or conducting product presentations, acquires data regarding the vehicle 124o of interest, and implements the product presentation for the customer using the acquired data.

So as to achieve this purpose, the ECU 70 is equipped with a wireless unit (communication unit) 126 through which it accesses the information storage server 200. More specifically, the wireless unit 126 is configured so that it can access the information storage server 200 via an Internet 128. In other words, a data network is established between each auto dealer's showroom 120 and the head office.

The information storage server 200 stores information including at least the data required for implementing product presentations regarding at least one among the performance, specifications and operation of each vehicle 124. To be more specific, the data required for implementing product presentations stored in the information storage server 200 is highly-detailed, up-to-date data regarding product performance, specifications, operation, features and the like. In addition to such data required for implementing or conducting product presentations, the information storage server 200 also stores various other kinds of information such as updates on traffic regulation revisions under consideration, traffic accident prevention techniques, weather forecasts, traffic congestion conditions, and the like.

Therefore, in the auto dealer's showroom 120, the robot 1 is guided by the processing performed in the image recognition unit 102 and the like to move to the vehicle 124o the customer wants information about and, after the customer is seated in the driver's seat, seats itself in the front passenger's seat, recognizes customer questions (inquiries) through the processing performed by the voice recognition unit 104 and the like, and operates the utterance generation unit 132 through the action control unit 112 so as to drive the speaker 52b of the voice input-output unit 52, thereby giving spoken replies to the questions. Moreover, during the exchange of questions and answers, the robot 1 operates the movement control unit 130 via the action control unit 112 to move a member constituting the robot 1, e.g., to turn its head 4 toward the customer by means of the electric motor 46 and the like, and, when necessary, drives the member such as the arms 5 and hands 40 by means of the electric motors 30 and the like so as to include gestures in the product presentation.

More specifically, the vehicle identification unit 110c identifies or determines which vehicle 124 in the showroom is the vehicle 124o the customer wants to receive a product presentation on or which vehicle 124 in the parking lot 122 is the vehicle 124o the customer wants to test drive (and also receive a product presentation on), outputs the determination result to the product presentation unit 110d, and the product presentation unit 110d acquires data on the vehicle 124o, thereby enabling a product presentation to be implemented. Since the vehicles 124 in the parking lot 122 are locked, the vehicle identification unit 110c also unlocks the vehicle 124o (and locks it again later).

At the time of identifying or determining the vehicle 124o with regard to which the customer wants a product presentation (or wants to test drive in addition to receiving a product presentation), the vehicle identification unit 110c identifies or determines the vehicle of interest from among the vehicles 124 in the showroom by analyzing in the image recognition unit 102 the images taken by the CCD cameras 50, more exactly both by analyzing the images in the image recognition unit 102 and processing of the customer's voice in the voice recognition unit 104, and identifies or determines the vehicle of interest from among the vehicles 124 in the parking lot 122 based on signals transmitted by IC tags placed in the vehicles 124.

One of the IC tags, designated by reference numeral 140, is placed at an appropriate location on or near the dashboard of each vehicle (subject) 124 parked in the parking lot 122 and, as shown in FIG. 4, the ECU 70 is equipped with an IC tag signal receiver (reader) 142 for receiving the IC tag signals transmitted (sent) by the IC tags 140.

More specifically, the combination of the IC tag 140 and IC tag signal receiver (reader) 142 enables the ECU 70 to exhibit RFID (Radio Frequency Identification) capability. As shown in FIG. 5, the vehicle identification unit 110c uses the signals received via the IC tag signal receiver 142 to identify the vehicle 124o that the customer wants to test drive (and receive a product presentation on).

Figure 7:
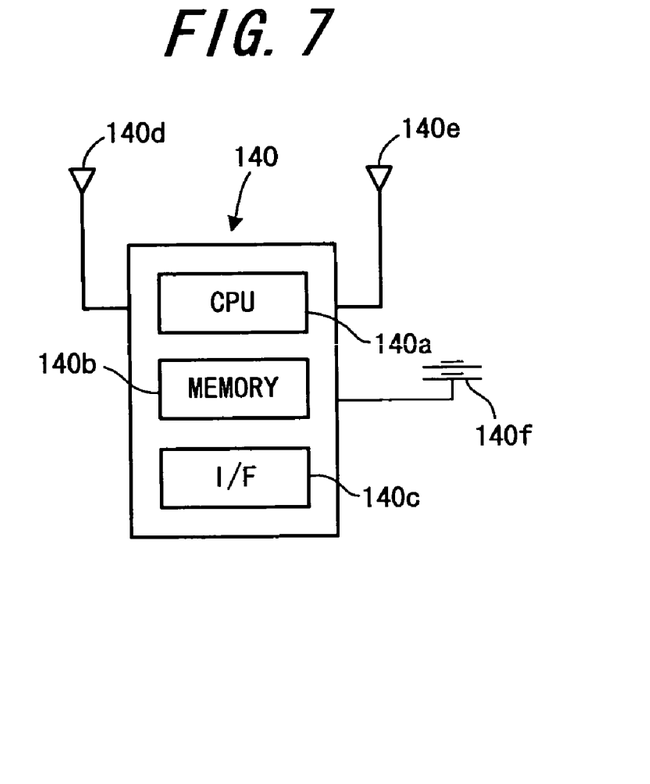
FIG. 7 is a block diagram showing the configuration of an IC tag placed in each of the vehicles (products) shown in FIG. 6.

As shown in the block diagram of FIG. 7, the IC tag 140 is equipped with a CPU 140a, memory unit 140b, input-output interface (I/F) 140c, receiving antenna 140d, and transmitting antenna 140e, and is configured as an active IC tag having a built-in power source 140f.

Figure 8:
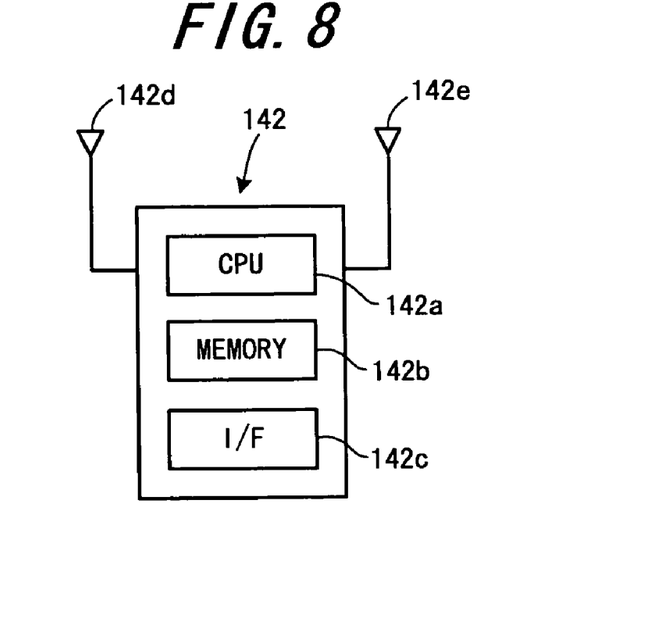
FIG. 8 is a block diagram showing the configuration of an IC tag signal receiver (reader) shown in FIGS. 4 and 5.

As shown in the block diagram of FIG. 8, the IC tag signal receiver 142 is equipped with a CPU 142a, memory unit 142b, input-output interface (I/F) 142c, receiving antenna 142d, and transmitting antenna 142e.

The IC tag signal receiver 142 transmits a wakeup signal from its transmitting antenna 142e. The IC tag 140 receives the wakeup signal through its receiving antenna 140d and responds thereto by transmitting a signal (frequency signal) from its transmitting antenna 140e. The frequency of the transmitted signal is specific to the particular IC tag 140 and thus to the particular vehicle 124 in which it is placed. The IC tag signal receiver 142 receives the signal transmitted from the IC tag 140 through its receiving antenna 142d.

As shown in FIG. 5, the keyless entry device 7 incorporated in the body 3 of the robot 1 is connected to the ECU 70.

Figure 9:
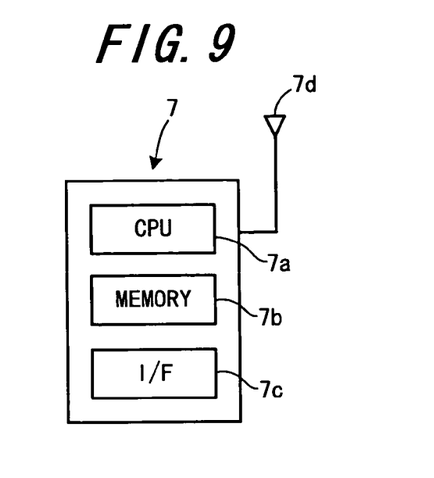
FIG. 9 is a block diagram showing the configuration of a keyless entry device shown in FIGS. 4 and 5.

As shown in the block diagram of FIG. 9, the keyless entry device 7 is equipped with a CPU 7a, memory unit 7b, input-output interface (I/F) 7c, and transmitting antenna 7d. When driven by the ECU 70, the keyless entry device 7 transmits an unlock signal (or lock signal) from the transmitting antenna 7d. The microcomputer 100, keyless entry device 7, IC tag signal receiver 142 and the like are powered by a battery accommodated in the housing unit 6.

As shown in FIG. 5, the microcomputer 100 of the ECU 70 is equipped with a keyless database 144 in addition to the map database 108. The keyless database 144 stores a set of transmit signals to be transmitted by the IC tags 140 placed in the respective vehicles 124 and a set of unlock (and lock) signals defined for the respective vehicles 124.

The unlock signals are electromagnetic signals separately defined for the individual vehicles 124. When driven by the ECU 70, the keyless entry device 7 transmits an unlock signal from its transmitting antenna 7d to operate an electric motor or other such actuator 124o installed in a door-lock mechanism (not shown) of the corresponding vehicle 124, thereby unlocking the door.

Transmission of the unlock signal when the door is locked unlocks the door and transmission of the lock signal when the door is unlocked locks the door, so that the unlock signal and lock signal can be the same signal. In the following description, therefore, the term "unlock signal" is sometimes used for the unlock signal and the lock signal taken together.

Figure 10:
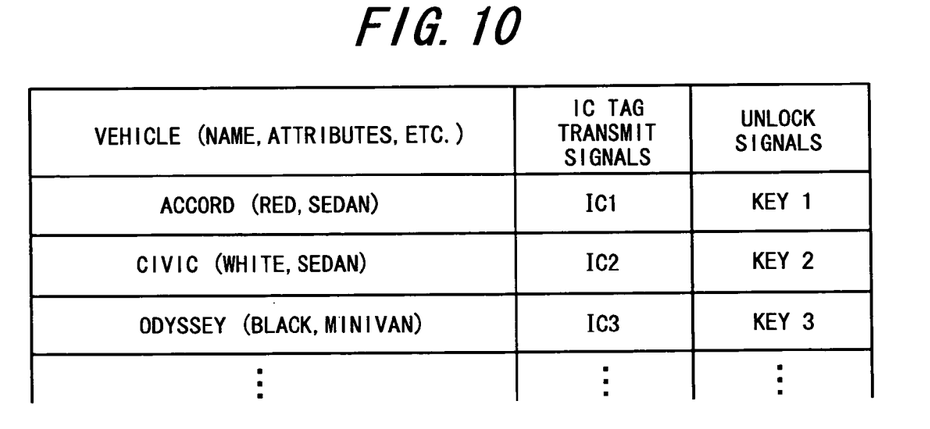

The signal sets stored in memory will be explained with reference to FIG. 10. The set of unlock signals (designated in the drawing as "key n," where n represents 1, 2, 3, . . . ) defined for the individual vehicles 124 are stored in memory in association with the aforesaid set of IC tag 140 transmit signals ("IC n" in the figure) defined for the individual IC tags 140. The name, attributes (color, model etc.) and the like of the corresponding vehicles 124 are also stored in association therewith.

In other words, in light of the fact that customers designate vehicles using names and attributes like body color, in the manner of "that red Accord" or "the white Civic over there," the set of unlock signals and the like are stored in association with the names and attributes likely to be used to identify the vehicles 124. Although the body colors are assigned formal designations like "Milan Red," customers usually refer to colors using everyday words so it is these that are stored in memory.

The sequence of operations of the robot 1 shown in FIG. 1 will now be explained with reference to the flowchart of FIG. 11. Exactly speaking, these are operations executed by the CPU 100*a* of the microcomputer 100 of the ECU 70.

In S10, the intention of the customer is recognized. In other words, through the processing implemented by the image recognition unit 102, voice recognition unit 104 and the like, it is recognized which of the vehicles 124 on display in the showroom the customer wants a product presentation on or which of the vehicles 124 in the parking lot the customer wants to test drive (or both test drive and receive a product presentation on).

Next, in S12, it is checked from the result of the recognition whether the customer is interested only in receiving a product presentation, and when the result of the check is Yes, the program goes to S14, in which the vehicle 124*o* of interest is determined through image recognition and voice recognition processing. In other words, through the processing implemented by the image recognition unit 102, voice recognition unit 104 and the like, the vehicle 124*o* of interest is identified or determined from spoken (or gestured) instructions of the customer regarding the vehicles 124 in the showroom such as "that red Accord."

Next, in S16, the information storage server 200 is accessed regarding the determined vehicle to acquire the data needed for implementing or conducting a product presentation on the vehicle 124*o* of interest.

Next, in S18, after the customer is seated in the driver's seat, the robot 1 seats itself in the front passenger's seat, recognizes customer questions and operates the utterance generation unit 132 through the action control unit 112 so as to drive the speaker 52*b*, thereby implementing or conducting a product presentation in response to the recognized questions based on the acquired data. During the product presentation, replies are made while driving the arms 5, hands 40 and other constituent members of the robot as required. Moreover, time permitting, the explanation is expanded beyond the product presentation to include, for example, updates on traffic regulation revisions under consideration, traffic accident prevention techniques, weather forecasts, and traffic congestion conditions on the roads R and other surrounding roads.

When the result in S12 is No, it can be concluded that the customer wants to test drive (or both test drive and receive a product presentation on) one of the vehicles 124 in the parking lot, so the program goes to S20, in which the robot 1 responds to the action decided by the action decision unit 110 by moving to the parking lot 122 together with the customer, while making reference to the map information stored in the map database 108.

Next, in S22, the customer's instruction is recognized through voice recognition by the voice recognition unit 104, and the transmit signal of the IC tag 140*o* corresponding to the vehicle 124*o* presumed (identified) to be the one of interest from the recognized instructions of the customer is retrieved from the set of transmit signals transmitted by the IC tags 140 placed in the respective vehicles 124 in the parking lot 122 and the robot 1 moves in the direction thereof.

As explained above, this is achieved by recognizing attributes of the vehicle 124 from an utterance (voice) of the customer such as "that red Accord" or by deducing the vehicle 124*o* of interest through recognition of customer gestures such as finger-pointing and then retrieving the corresponding transmit signal (ICn) from the keyless database 144 whose characteristics are shown in FIG. 9. At the same time, the location of the vehicle 124*o* of interest is recognized by image recognition and the robot 1 guides the customer in the direction thereof.

Next, in S24, the IC tag 140*o* that transmits the signal corresponding to the transmit signal retrieved from among the IC tags 140 placed in the vehicles 124 is identified. In actual practice, this is achieved by moving toward the vehicle 124*o* presumed to be the one of interest together with the customer, then, upon coming near the vehicle 124*o* transmitting a wakeup signal in the direction of the IC tag 140*o* placed therein, receiving the transmit signal transmitted in response, and checking whether it coincides with the retrieved transmit signal.

Further, the vehicle 124 in which the determined IC tag 140*o* is placed is identified to be the vehicle 124*o* of interest and the unlock signal (key-n) corresponding to the identified vehicle is retrieved from the set of unlock (lock) signals for the respective vehicles 124 stored in memory. This is achieved by accessing the keyless database 144 to retrieve the unlock signal (key-n) corresponding to the transmit signal (ICn) of the identified IC tag 140*o*. Next, the keyless entry device 7 is driven to transmit the retrieved unlock signal, thereby unlocking the door of the identified vehicle 124*o* of interest. As explained earlier, the door can be relocked later by transmitting the same signal.

Next, in S26, similarly to the procedure in S16, the information storage server 200 is accessed regarding the identified vehicle of interest to acquire the data needed for implementing or conducting a product presentation on the vehicle 124*o* of interest.

Next, in S28, after the customer is seated in the driver's seat, the robot 1 seats itself in the front passenger's seat and, referring to the map stored in the map database 108, directs the customer along the test-drive course (indicated by arrows in FIG. 6) based on its own position estimated by the self-position estimation unit 106 from the outputs of the GPS receiver 62 and the like. It also concurrently implements a product presentation similarly to what was explained regarding S18.

Being configured as set out in the foregoing, the robot 1 according to this embodiment can reduce the burden of an auto salesperson. Moreover, it is well adapted to offer a broad range of useful services to the customer because it is capable of offering not only product information but also information regarding traffic regulation changes, traffic accident prevention and the like.

Moreover, owing to the use of image processing (and voice recognition processing), the IC tags 140 and the like to identify or determine the vehicle 124*o* of interest, the vehicle 124*o* of interest can be identified with high reliability and the auto salesperson can be saved the work of identifying the vehicle 124*o* of interest, so that the burden on the auto salesperson is further reduced.

Further, owing to the adoption of a configuration that enables robot responses by driving constituent members of the robot such as the head 4, arms 5, hands 40 and utterance unit constituted of the utterance generation unit 132 and speaker 52*b*, it is possible to offer sophisticated responses to customer questions, while also establishing closer rapport with the customer.

In addition, the product presentation robot 1 is configured to ride in the vehicle 124o next to the customer, estimate its own position by means of the built-in GPS receiver 62 and the like, and implement the product presentation while concurrently directing the customer along the test-drive course with reference to the map stored in memory. As a result, it can avoid obstacles and the like as it moves about the surrounding vicinity and, further, can implement the product presentation while, for example, concurrently utilizing the utterance unit to direct the customer along the test-drive course, thus further reducing the burden of the auto salesperson by providing test-drive guidance in addition to the product presentation.

Furthermore, since the robot 1 is configured to access the information storage server 200 via the Internet 128, it can easily acquire data in large quantities and is therefore able to make a highly effective product presentation that gives thorough answers to questions asked by the customer.

Still further, the configuration of the robot 1 as a mobile biped robot (that walks on two legs) eliminates any feeling of unnaturalness on the part of the customer and enables responses to the customer by operating such constituent members of the robot as the head 4, arms 5 and hands 40, thereby enabling a highly effective product presentation that gives thorough answers to questions asked by the customer.

Figure 12:
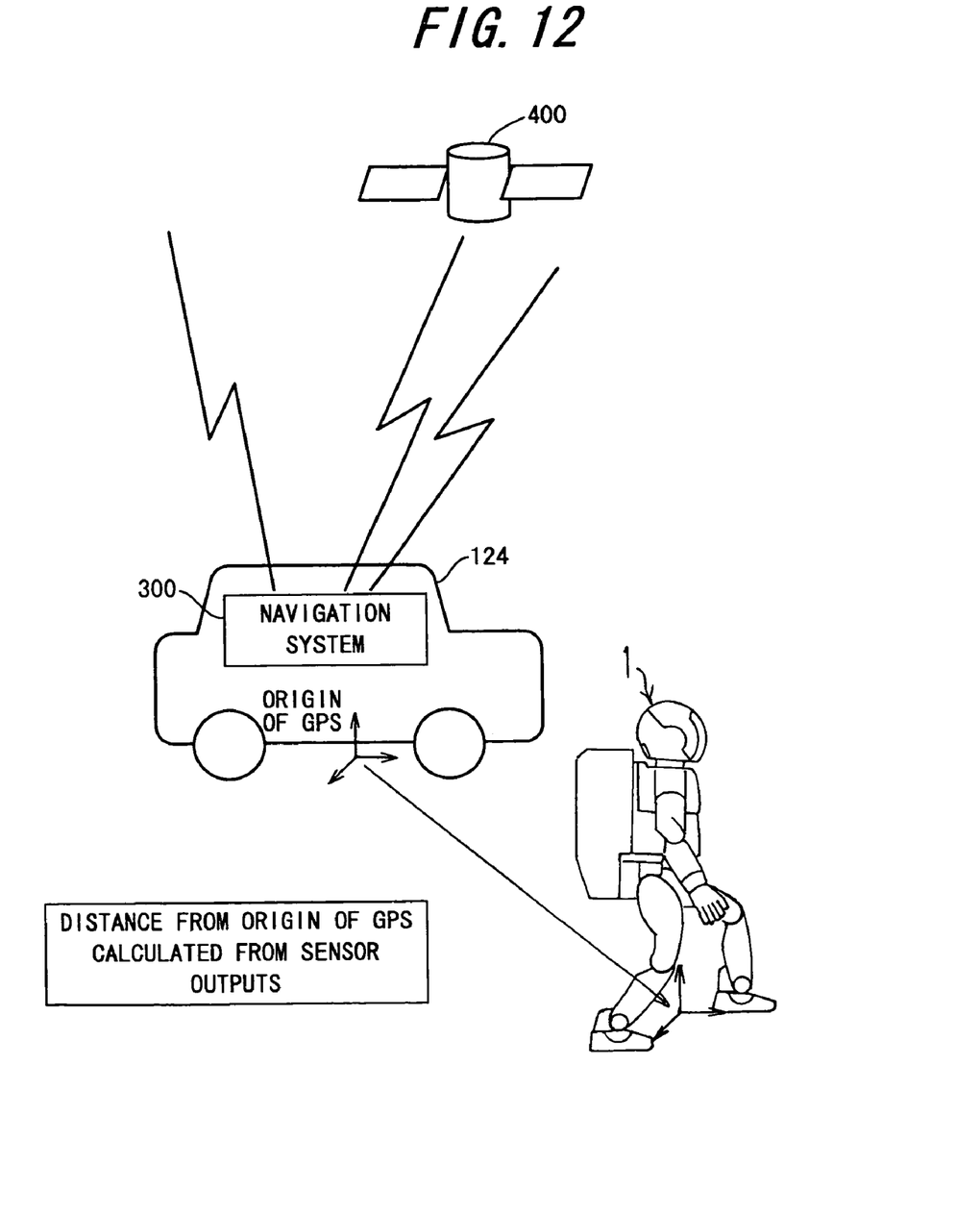
FIG. 12 is an explanatory diagram showing a product presentation robot according to a second embodiment of the invention.

FIG. 12 is an explanatory diagram showing a mobile robot 1 according to a second embodiment of the invention.

In the second embodiment, each of the vehicles 124 is equipped with a navigation system 300 and the robot 1 utilizes the navigation system 300 to estimate its own position.

Figure 13:
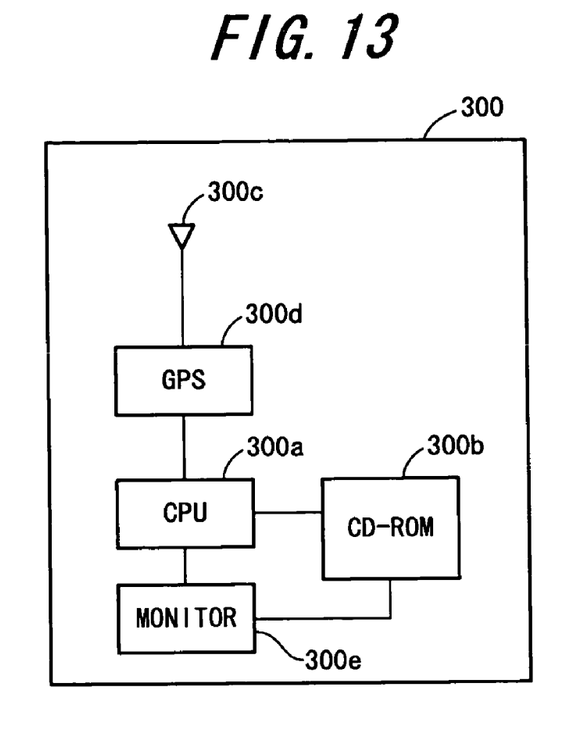
FIG. 13 is a block diagram showing the configuration of a navigation system used in the second embodiment.

FIG. 13 is a block diagram showing the configuration of the navigation system 300. The navigation system 300 is equipped with a CPU 300a, a CD-ROM 300b storing a wide-area road map covering the driving region shown in FIG. 6 required for test driving and the roads R in the vicinity of the auto dealer's showroom 120, a GPS receiver 300d, similar to the GPS receiver 62 built into the robot 1, for receiving signals from GPS satellites 400 (only one shown) through an antenna 300c, and a monitor 300e. The navigation system 300 and ECU 70 are interconnected via the wireless unit 126 for communication with each other.

Figure 11:
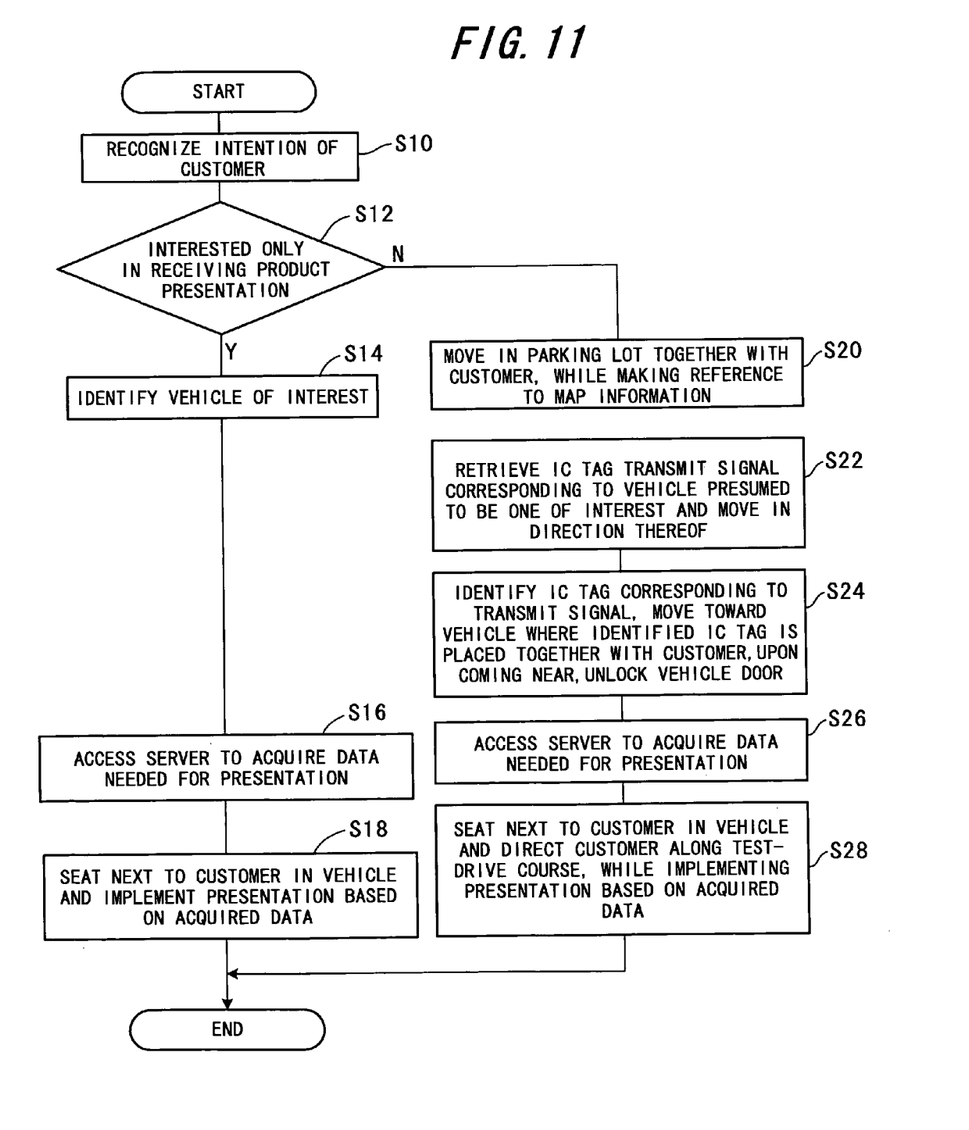
FIG. 11 is a flowchart showing the sequence of operations of the product presentation robot shown in FIG. 1.
Figure 14:
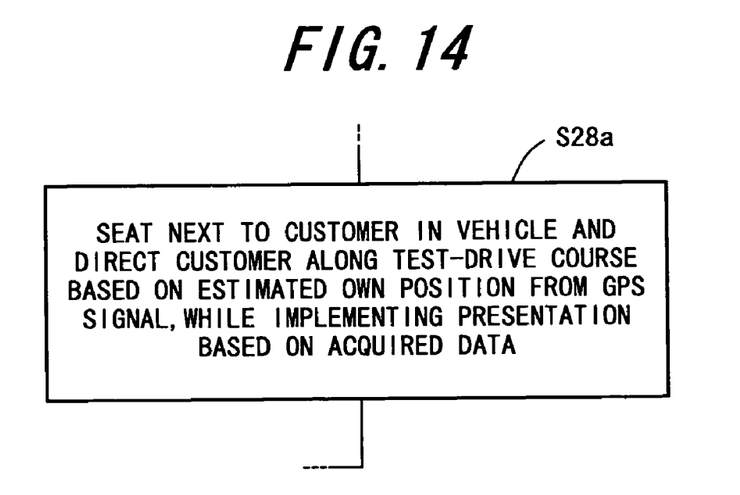
FIG. 14 is a step in the flowchart of FIG. 11 defining an operation of the robot according to the second embodiment.

FIG. 14 is a step in the flowchart of FIG. 11 defining an operation of the robot 1 according to the second embodiment.

In S28a of the flowchart of the second embodiment, the robot 1 inputs the output of the GPS receiver 300d of the navigation system 300 installed in the vehicle 124o of interest, through the wireless unit 126 and, with reference to the map stored in the map database 108, the robot 1 estimates its own position by means of processing performed in the self-position estimation unit 106 and, based thereon, directs the customer along the test-drive course, while concurrently implementing a product presentation.

After the robot 1 gets out of the vehicle, its GPS coordinates at that time are sent to the self-position estimation unit 106 of the ECU 70 through the wireless unit 126 for use as the origin of the local coordinate system of the robot 1. Next, the distance moved by the robot 1 calculated from the outputs of the rotary encoders, force sensors 56 and other internal sensors is added to the origin to estimate the current position of the robot 1.

Owing to the foregoing configuration, the robot 1 can estimate its own position with high accuracy, without being equipped with the GPS receiver 62.

The second embodiment is the same as the first embodiment in other aspects, including the steps in the flow of operations other than that shown in FIG. 14, and also provides the same effects.

The first and second embodiment are thus configured to have a product presentation robot (1) implementing presentation of products (such as vehicles 124) through explanation of at least one among performance, specifications and operation of the products, comprising: a communication unit (wireless unit 126) being capable of communicating with a database (information storage server 200) located externally of the robot and storing information including at least data needed for implementing the presentation of the products; a data acquirer (CPU 100a, vehicle identification unit 110c, product presentation unit 110d, S10 to S16, S20 to S26) accessing the database through the communication unit to acquire the data needed for implementing the presentation of one (vehicle 124o) from among the products interested by a customer; and a product presentation implementor (CPU 100a, product presentation unit 110d, action control unit 112, S18, S28, S28a) implementing the presentation of the one from among the products to the customer based on the acquired data.

In the robot, the data acquirer includes: an IC tag signal database (keyless database 144) storing IC tag signals (ICn) transmitted by IC tags (140) placed in the products; an IC tag signal retriever (CPU 100a, vehicle identification unit 110c, S22) retrieving one (140a) from among the IC tag signals, stored in the IC tag signal database, that is corresponding to the one from among the products interested by the customer; an IC tag identification implementor (CPU 100a, vehicle identification unit 110c, S24) identifying one from among the IC tags that transmits a signal corresponding to the retrieved IC tag signal; and a product identification implementor (CPU 100a, vehicle identification unit 110c, S26) identifying the one from among the products from the identified IC tag and acquires the data from the database needed for implementing the presentation of the identified product.

In the robot, the data acquirer includes; a camera (CCD cameras 50) taking and producing images of surrounding of the robot; and a product identification implementor (CPU 100a, vehicle identification unit 110c) identifying the one from among the products by analyzing the taken images; and acquires the data from the database needed for implementing the presentation of the identified product.

In the robot, the product presentation implementor includes: a voice recognition unit (CPU 100a, voice recognition unit 104) recognizing a voice of the customer; an utterance generator (utterance generation unit 132, speaker 52b of voice input/output device 52) generating synthesized voice signals for utterance to the customer; and a response generator (CPU 100a, product presentation unit 110d, action control unit 112, S16, S26) recognizing a question raised from the customer and generating a spoken reply to the recognized question by operating at least one of the utterance generator and a member constituting the robot (such as the head 4, arms 5, hands 40)

In the robot, the products are vehicles (124) and further including: a map database (108) storing information on a map of a region including a test-driving course; and the product presentation implementor implements the presentation of the one from among the products to the customer based on the acquired data, while directing along the test-driving course to the customer in accordance with the stored map information (S26).

The robot further includes: a self-position estimator (CPU 100a, self-position estimation unit 106) estimating own position based on at least one of a GPS receiver (62) built in the robot and a GPS receiver (300d) installed in the vehicles; the product presentation implementor implements the presentation of the one from among the products to the customer based on the acquired data, while directing along the test-driving course to the customer in accordance with the stored map information.

In the robot, the communication unit (wireless unit 126) accesses the database via an Internet (128).

The robot (1) comprises a biped robot having a body (3) and a pair of legs (leg linkages 2) connected to the body.

It should be noted in the above, although the vehicle 124 has been taken as an example of the product to be explained (or test operated) in the foregoing, this invention is not limited to application to a vehicle but can be applied to any product requiring a detailed explanation.

It should also be noted that, although the keyless entry device 7 has been explained as being built into the robot 1 in the foregoing, it is instead possible for it to be held in one of the hands 40 of the robot 1.

It should further be noted that, although a biped robot has been taken as an example of the invention robot in the foregoing, the robot is not limited to a biped robot and can instead be a robot with three or more legs and is not limited to a legged mobile robot but can instead be a wheeled or crawler-type robot.

Japanese Patent Application No. 2004-193754 filed on Jun. 30, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A product presentation robot implementing presentation of products through explanation of at least one among performance, specifications and operation of the products, comprising:
   a communication unit being capable of communicating with a database located externally of the robot and storing information including at least data needed for implementing the presentation of the products;
   a data acquirer accessing the database through the communication unit to acquire the data needed for implementing the presentation of one from among the products interested by a customer; and
   a product presentation implementor implementing the presentation of the one from among the products to the customer based on the acquired data.

2. The robot according to claim 1, wherein the data acquirer includes:
   an IC tag signal database storing IC tag signals transmitted by IC tags placed in the products;
   an IC tag signal retriever retrieving one from among the IC tag signals, stored in the IC tag signal database, that is corresponding to the one from among the products interested by the customer;
   an IC tag identification implementor identifying one from among the IC tags that transmits a signal corresponding to the retrieved IC tag signal; and
   a product identification implementor identifying the one from among the products from the identified IC tag, and
   wherein the data acquirer acquires the data from the database needed for implementing the presentation of the identified product.

3. The robot according to claim 1, wherein the data acquirer includes:
   a camera taking and producing images of surrounding of the robot; and
   a product identification implementor identifying the one from among the products by analyzing the taken images, and
   wherein the data acquirer acquires the data from the database needed for implementing the presentation of the identified product.

4. The robot according to claim 1, wherein the product presentation implementor includes:
   a voice recognition unit recognizing a voice of the customer;
   an utterance generator generating synthesized voice signals for utterance to the customer; and
   a response generator recognizing a question raised from the customer and generating a spoken reply to the recognized question by operating at least one of the utterance generator and a member constituting the robot.

5. The robot according to claim 1, wherein the products are vehicles, wherein the robot further includes:
   a map database storing information on a map of a region including a test-driving course, and
   wherein the product presentation implementor implements the presentation of the one from among the products to the customer based on the acquired data, while directing along the test-driving course to the customer in accordance with the stored map information.

6. The robot according to claim 1, further including:
   a self-position estimator estimating own position based on at least one of a GPS receiver built in the robot and a GPS receiver installed in the vehicles,
   wherein the product presentation implementor implements the presentation of the one from among the products to the customer based on the acquired data, while directing along the test-driving course to the customer in accordance with the stored map information.

7. The robot according to claim 1, wherein the communication unit accesses the database through via an internet.

8. The robot according to claim 1, wherein the robot comprises a biped robot having a body and a pair of legs connected to the body.

* * * * *